US012137814B2

(12) United States Patent
Tan et al.

(10) Patent No.: US 12,137,814 B2
(45) Date of Patent: Nov. 12, 2024

(54) POCKET SPRING STRING, POCKET SPRING MATTRESS CORE, AND MATTRESS

(71) Applicant: Guangzhou Lianrou Machinery & Equipment Co., Ltd., Guangdong (CN)

(72) Inventors: Zhiming Tan, Guangdong (CN); Jie Liang, Guangdong (CN); Zhiliang Tan, Guangdong (CN)

(73) Assignee: GUANGZHOU LIANROU MACHINERY & EQUIPMENT CO., LTD., Guangdong (CN)

( * ) Notice: Subject to any disclaimer, the term of this patent is extended or adjusted under 35 U.S.C. 154(b) by 609 days.

(21) Appl. No.: 17/420,385

(22) PCT Filed: Dec. 13, 2019

(86) PCT No.: PCT/CN2019/125147
§ 371 (c)(1),
(2) Date: Jul. 1, 2021

(87) PCT Pub. No.: WO2021/103182
PCT Pub. Date: Jun. 3, 2021

(65) Prior Publication Data

US 2022/0087441 A1 Mar. 24, 2022

(30) Foreign Application Priority Data

Nov. 25, 2019 (CN) ......................... 201911166754.3

(51) Int. Cl.
*A47C 27/06* (2006.01)
*A47C 27/07* (2006.01)
*B68G 9/00* (2006.01)

(52) U.S. Cl.
CPC ............ *A47C 27/064* (2013.01); *A47C 27/07* (2013.01); *B68G 9/00* (2013.01); *A47C 27/06* (2013.01); *A47C 27/063* (2013.01)

(58) Field of Classification Search
CPC ..... A47C 27/064; A47C 27/063; A47C 27/07; A47C 27/06; B68G 9/00
(Continued)

(56) References Cited

U.S. PATENT DOCUMENTS 2,862,214 A * 12/1958 Thompson et al. ... A47C 27/04 5/720
3,869,739 A * 3/1975 Klein ..................... A47C 27/20 5/718
(Continued)

FOREIGN PATENT DOCUMENTS

CN 1803069 A 7/2006
CN 2834320 Y 11/2006
(Continued)

OTHER PUBLICATIONS

Office Action issued Jun. 24, 2022 in European Application No. 19954243.2.

(Continued)

*Primary Examiner* — Robert G Santos
(74) *Attorney, Agent, or Firm* — Panitch Schwarze Belisario & Nadel LLP

(57) ABSTRACT

A pocket spring string, a pocket spring mattress core and a mattress. The pocket spring string includes: springs; cloth, which is folded and provided with welds to form multiple adjacent pockets, each pocket being provided with an opening, and the springs being received in the pockets respectively; and thread provided to stitch the openings so that the springs are packaged in the pockets in a compressed state. The pocket spring mattress core is formed by connection of the pocket spring strings, and the mattress includes a mattress cover and the pocket spring mattress core. Because the top and/or bottom of each pocket is provided with the opening which is stitched by the thread, when the thread is removed, the springs can be quickly separated from the
(Continued)

pockets, so that the metal material and the cloth are separated without any special technical means.

15 Claims, 12 Drawing Sheets

(58) Field of Classification Search
USPC ................................ 5/716, 720, 655.7, 655.8
See application file for complete search history.

(56) References Cited

U.S. PATENT DOCUMENTS

| | | | | |
|---|---|---|---|---|
| 5,048,167 | A * | 9/1991 | Heffley | A47C 27/063 29/402.11 |
| 6,398,199 | B1 * | 6/2002 | Barber | A47C 27/064 5/655.8 |
| 6,540,214 | B2 * | 4/2003 | Barber | A47C 27/064 5/655.8 |
| 6,883,196 | B2 * | 4/2005 | Barber | A47C 27/064 5/655.8 |
| 9,060,616 | B2 | 6/2015 | Cohen | |
| 10,034,553 | B2 * | 7/2018 | Long | A47C 27/064 |
| 10,076,193 | B2 * | 9/2018 | Long | B29C 65/522 |
| 10,172,472 | B2 * | 1/2019 | Long | B29C 66/83411 |
| 11,324,333 | B2 * | 5/2022 | Bergner | A47C 23/043 |
| 2002/0113348 | A1 * | 8/2002 | Barber | A47C 27/064 267/93 |
| 2004/0133988 | A1 * | 7/2004 | Barber | A47C 27/064 5/716 |
| 2017/0251820 | A1 * | 9/2017 | Long | A47C 27/008 |
| 2017/0251821 | A1 * | 9/2017 | Long | B29C 66/71 |
| 2017/0303696 | A1 | 10/2017 | Sherman et al. | |
| 2018/0303246 | A1 * | 10/2018 | Long | A47C 27/008 |
| 2020/0323353 | A1 * | 10/2020 | Bergner | F16F 3/04 |
| 2022/0087441 | A1 * | 3/2022 | Tan | A47C 27/064 |

FOREIGN PATENT DOCUMENTS

| | | | | |
|---|---|---|---|---|
| CN | 103156439 | A | 6/2013 | |
| CN | 103653964 | A | 3/2014 | |
| CN | 206889540 | U | 1/2018 | |
| CN | 107692646 | A | 2/2018 | |
| CN | 109092864 | A | 12/2018 | |
| EP | 2789269 | A1 | 10/2014 | |
| EP | 3881719 | A1 * | 9/2021 | A47C 27/04 |
| EP | 3881719 | B1 * | 5/2024 | A47C 27/04 |
| FR | 2697420 | A1 * | 5/1994 | A47C 27/064 |
| JP | 05176831 | A | 7/1993 | |
| JP | 1190063 | A | 6/1999 | |
| KR | 20090045785 | A | 5/2009 | |
| WO | 0244077 | A1 | 6/2002 | |
| WO | 2005055771 | A1 | 6/2005 | |
| WO | 2014095550 | A1 | 6/2014 | |
| WO | 2016149302 | A1 | 9/2016 | |
| WO | WO-2021103182 | A1 * | 6/2021 | A47C 27/04 |

OTHER PUBLICATIONS

Int'l Search Report issued Jun. 29, 2020 in Int'l Application No. PCT/CN2019/125147.
Office Action issued Jul. 31, 2020 in CN Application No. 20191116754.3.
Search Report issued Jul. 23, 2020 in CN Application No. 20191116754.3.
Supplementary Search Report issued Mar. 16, 2021 in CN Application No. 20191116754.3.
Office Action issued Mar. 23, 2021 in CN Application No. 20191116754.3.

* cited by examiner

POCKET SPRING STRING, POCKET SPRING MATTRESS CORE, AND MATTRESS

CROSS-REFERENCE TO RELATED APPLICATIONS

This application is a Section 371 of International Application No. PCT/CN2019/125147, filed Dec. 13, 2019, which was published in the Chinese language on Jun. 3, 2021, under International Publication No. WO 2021/103182 A1, which claims priority under 35 U.S.C. § 119(b) to Chinese Application No. 201911166754.3, filed Nov. 25, 2019, the disclosures of each of which are incorporated herein by reference.

TECHNICAL FIELD

The invention relates to the technical field of pocket spring mattress, in particular to a pocket spring string, a pocket spring mattress core and a mattress.

BACKGROUND

A pocket spring is formed by wrapping individual springs at continuous intervals in a pocket, and all the individual pocket springs are connected successively to form a pocket spring string. The pocket spring strings are bonded and arranged together to form a pocket spring mattress core. Pocket springs usually refer to individual pocket springs or pocket spring strings.

Traditional pocket springs are formed by wrapping springs in folded cloth and forming ultrasonic welds on the cloth to separate adjacent springs from each other. For the pocket springs of such a structure, the cloth and the spring cannot be separated easily and need be separated by cutting and stripping with extra mechanical assistance or a high-pressure water cutting machine, or manual cutting, which features low work efficiency and high recycling cost.

SUMMARY

The invention aims at solving at least one of the technical problems in the prior art, and providing a pocket spring string, a pocket spring mattress core and a mattress which make it easy to recycle springs and cloth.

In a first aspect, the embodiments of the present invention provide a pocket spring, which comprises: springs; cloth, folded and provided with welds to form multiple adjacent pockets, the top and/or bottom of each pocket being provided with an opening, and the springs being received in the pockets respectively; and thread, provided at the top and/or the bottom of each pocket in a length direction of the pocket spring string, to stitch the openings so that the springs are packaged in the pockets in a compressed state.

According to the pocket spring string in the first aspect of the embodiments of the present invention, the thread is detachably stitched.

In a second aspect, the embodiments of the present invention provide a pocket spring mattress core, which comprises the pocket spring string described in the first aspect of the embodiments of the present invention, and adjacent pocket spring strings are bonded with glue and arranged side by side.

According to the pocket spring mattress core in the second aspect of the embodiments of the present invention, the cloth is polypropylene cloth and the glue is polypropylene glue.

In a third aspect, the embodiments of the present invention provides a pocket spring string, which comprises: springs; cloth, folded and provided with welds to form multiple adjacent pockets, the top and/or bottom of each pocket being provided with an opening, and the springs being received in the pockets respectively, wherein reserved gaps are arranged on the cloth every a preset distance; and thread, provided at the top and/or the bottom of each pocket in a length direction of the pocket spring string, to stitch the openings so that the springs are packaged in the pockets in a compressed state.

According to the pocket spring string according to the third aspect of the embodiments of the present invention, the thread is detachably stitched.

In a fourth aspect, the embodiments of the present invention provide a pocket spring mattress core, which comprises the pocket spring string described in the third aspect of the embodiments of the present invention, and each pocket spring string is subjected to snakelike folding at the corresponding reserved gap to form multiple rows of pocket spring strings, which are bonded with glue and arranged side by side.

According to the pocket spring mattress core in the fourth aspect of the embodiments of the present invention, the cloth is polypropylene cloth and the glue is polypropylene glue.

In a fifth aspect, the embodiments of the present invention provide a pocket spring string, which comprises: springs; cloth, folded and provided with welds to form a plurality of adjacent pockets, the top and/or bottom of each pocket being provided with an opening, and the springs being received in the pockets respectively, wherein at least two separation welds are arranged on the cloth to form separation gaps so as to separate adjacent pockets from each other; and thread, provided at the top and/or the bottom of each pocket in a length direction of the pocket spring string, to stitch the openings so that the springs are packaged in the pockets in a compressed state.

According to the pocket spring string according to the fifth aspect of the embodiments of the present invention, the thread is detachably stitched.

In a sixth aspect, the embodiments of the present invention provide a pocket spring mattress core, which comprises the pocket spring string described in the fifth aspect of the embodiments of the present invention. A single pocket spring string is subjected to snakelike folding to form multiple rows of pocket spring string, two adjacent rows of pocket spring string are connected through connection welds arranged at the separation gaps, and the connection welds are sequentially arranged every other separation gap in a length direction of the pocket spring string. The connection welds in one row are arranged in a staggered manner with the connection welds in the adjacent row, and the connection welds and the thread do not interfere with each other.

According to the pocket spring mattress core in the sixth aspect of the embodiments of the present invention, the connection weld is an ultrasonic weld.

In a seventh aspect, the embodiments of the present invention provide a mattress, which comprises a mattress core and a mattress cover wrapping the mattress core, and the mattress core is the above-mentioned pocket spring mattress core.

The pocket spring string, the pocket spring mattress core and the mattress at least have the following beneficial effects: because the top and/or bottom of each pocket is provided with the opening stitched by the thread, when the thread is removed, the springs can be quickly separated from the pockets, so that the metal material and the cloth are separated without any special technical means, the material separation efficiency is high, and the operation is convenient and quick. The pocket spring string, the pocket spring mattress core and the mattress are especially suitable for manual operation in families and beneficial to garbage classification and environmental protection.

BRIEF DESCRIPTION OF THE DRAWINGS

The present invention will be further described below with reference to the accompanying drawings and embodiments.

DETAILED DESCRIPTION OF EMBODIMENTS

Figure 1:
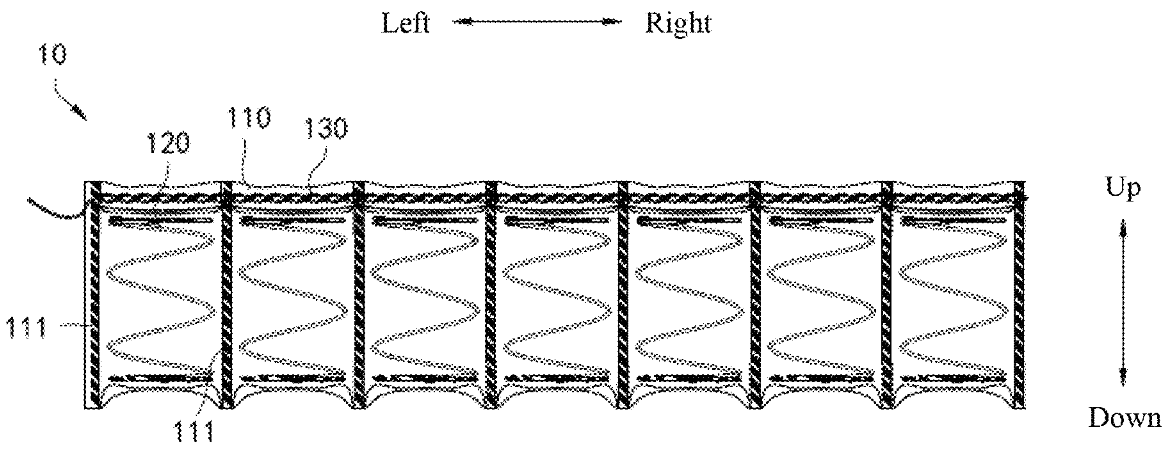
FIG. 1 is a side view of a first embodiment of a pocket spring string of the present invention.

This section will describe the specific embodiments of the present invention in detail, and the preferred embodiments of the present invention are shown in the attached drawings. The purpose of the attached drawings is to supplement the and vividly understand each technical feature and the overall technical scheme of the present invention, but they cannot be understood as limiting the scope of protection of the present invention.

In the description of the present invention, it should be understood that the orientation or position relationships indicated by terms like "upper", "lower", "front", "back", "left" and "right" are based on the orientation or position relationships shown in the drawings, only for the purpose of facilitating and simplifying the description of the present invention, and do not indicate or imply that the device or element referred to must have a specific orientation, or be constructed and operated in a specific orientation, and therefore cannot be understood as a limitation of the present invention.

In the description of the present invention, "a plurality of" means one or more, "multiple" means two or more, "greater than", "less than", "exceeding", etc. are understood as excluding the number referred to, and "above", "below", "within", etc. are understood as including the number referred to. Terms such as first and second are only for the purpose of distinguishing technical features, and cannot be understood as indicating or implying relative importance or implicitly indicating the number or the precedence relationship of technical features referred to.

In the description of the present invention, unless otherwise explicitly defined, words such as "arrange", "install" and "connect" should be understood in a broad sense, and those skilled in the art can reasonably determine the specific meanings of these words in the present invention in combination with the specific contents of the technical scheme.

Figure 2:
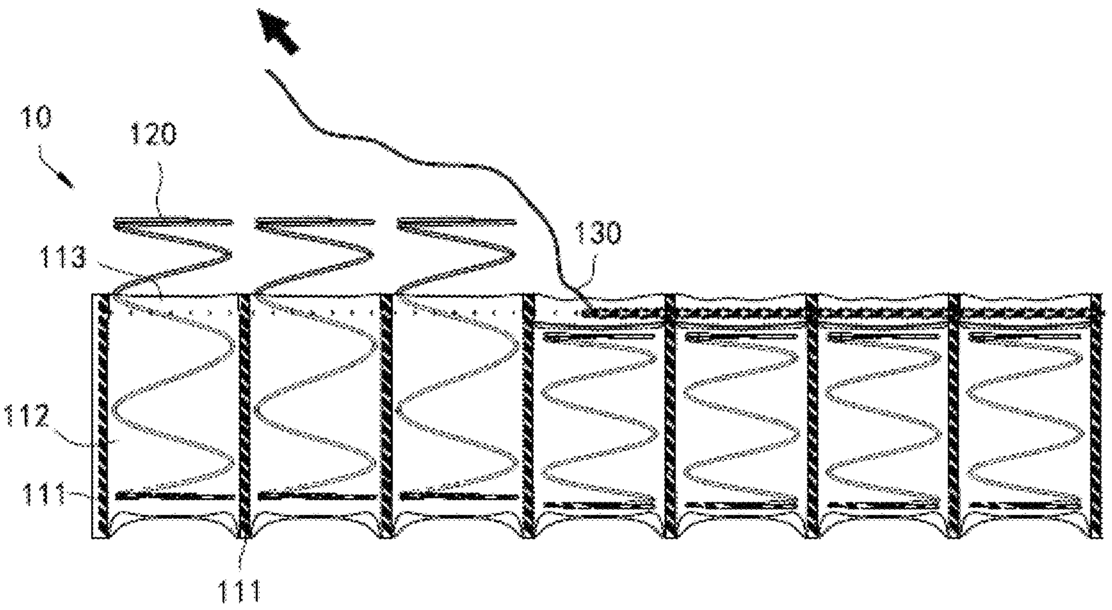
FIG. 2 is a schematic diagram of thread removal in the first embodiment of the pocket spring string of the present invention.

Referring to FIGS. 1 and 2, an embodiment of the present invention provides a pocket spring string 10, which comprises cloth 110 and springs 120 wrapped in the cloth 110. In the description of this embodiment, the orientation of "up", "down", "left" and "right" can be understood with reference to FIG. 1. The cloth 110 is folded in half from down to up. The upper part of the cloth 110 is open. Multiple welds 111 are arranged on the cloth 110 at intervals in the left-right direction, and the welds 111 are arranged in the up-down direction. A relatively independent pocket 112 is formed through every two adjacent welds 111 on the cloth 110, and the inside of each pocket 112 forms a chamber which can receive and wrap the corresponding spring 120. The welds 111 are ultrasonic welds. It is a well-known technology in the field to provide the welds 111 on the cloth 110, which will no longer be described in detail here.

Since the upper part of the cloth 110 is open, naturally, an opening 113 is formed in the upper part or top of each pocket 112, and the springs 120 can enter or leave the chambers of the pockets 112 through the openings 113. The upper part of the cloth 110, that is, the top of each pocket 112, is provided with a continuous thread 130, and the thread 130 stitches the opening 113 of each pocket 112, so that each spring 120 is wrapped in the chamber of the corresponding pocket 112 in a compressed state. When the thread 130 is removed, the springs 120 extend out of the openings 113 under their own elastic force.

It can be understood that both the upper part and the lower part of the cloth 110 can be open. For example, by aligning two pieces of cloth and arranging welds 111, naturally, openings 113 are formed in both the top and bottom of each pocket 112, and the upper and lower openings 113 of each pocket 112 are stitched by an upper thread and a lower thread, so that each spring 120 is wrapped in the chamber of the corresponding pocket 112 in a compressed state.

Figure 17:
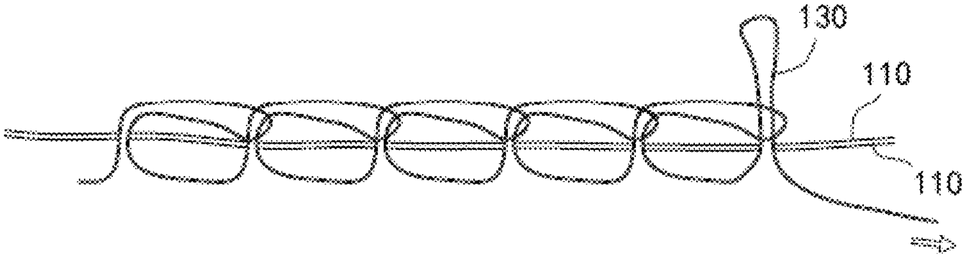
FIG. 17 is a schematic diagram of single thread stitching adopted in an embodiment of a pocket spring string of the present invention.
Figure 18:
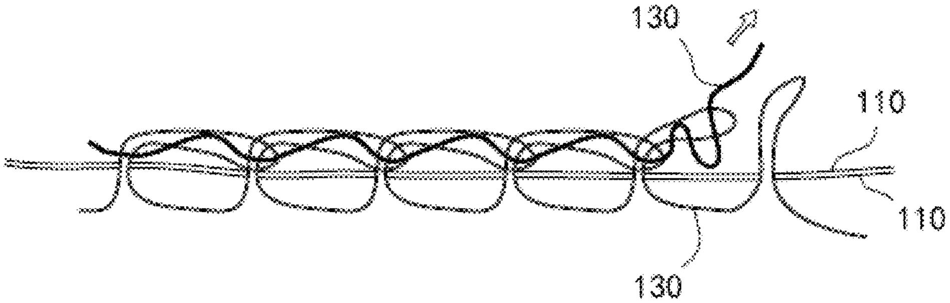
FIG. 18 is a schematic diagram of double thread stitching adopted in an embodiment of a pocket spring string of the present invention.

The thread 130 is detachably stitched on the cloth 110. In this embodiment, a stitching mode adopted by ordinary woven bags can be used, that is, a thread end is left at an end of the pocket spring string, so that when the thread end is cut off, the thread 130 can be quickly torn off. Single thread stitching or double thread stitching can be adopted. FIG. 17 shows that the thread 130 adopts the single thread stitching mode, and FIG. 18 shows that the thread 130 adopts the double thread stitching mode. When the thread end is cut off, the thread 130 can be quickly and easily removed by being pulled in the arrow direction. Those skilled in the art can flexibly select the stitching mode, as long as the thread can be quickly removed.

Figure 3:
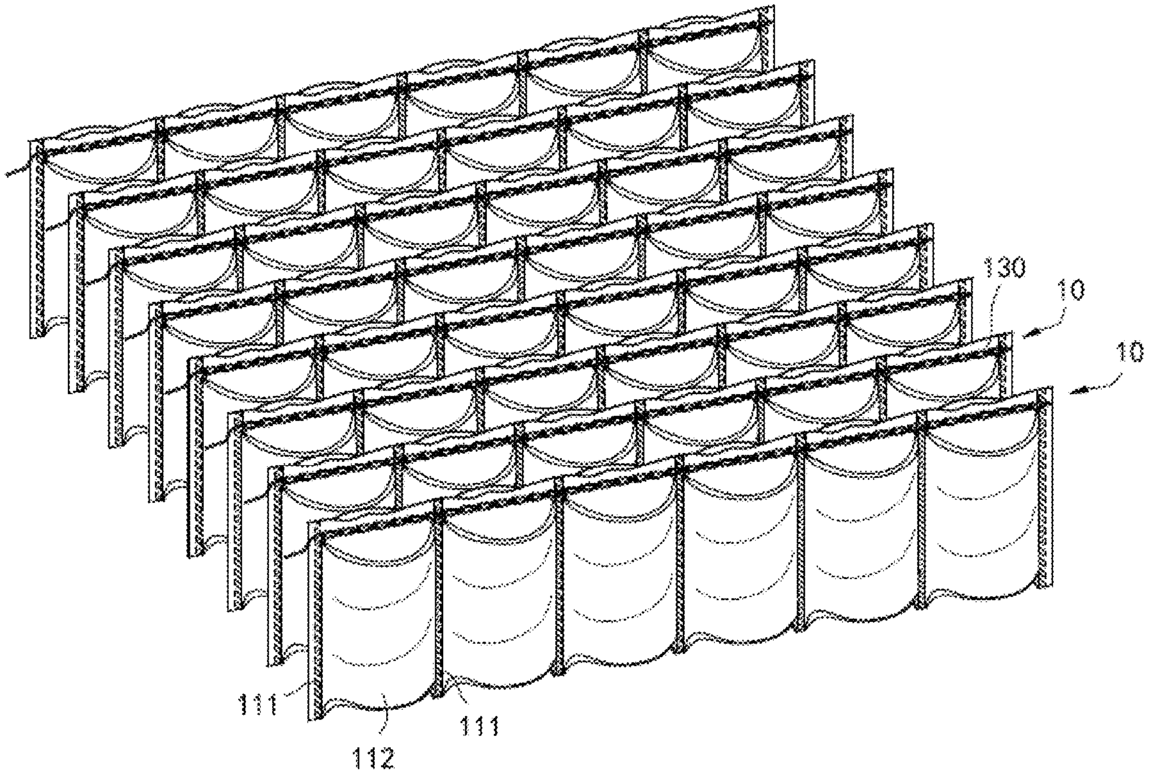
FIG. 3 is a schematic diagram of a first embodiment of a pocket spring mattress core of the present invention.
Figure 4:
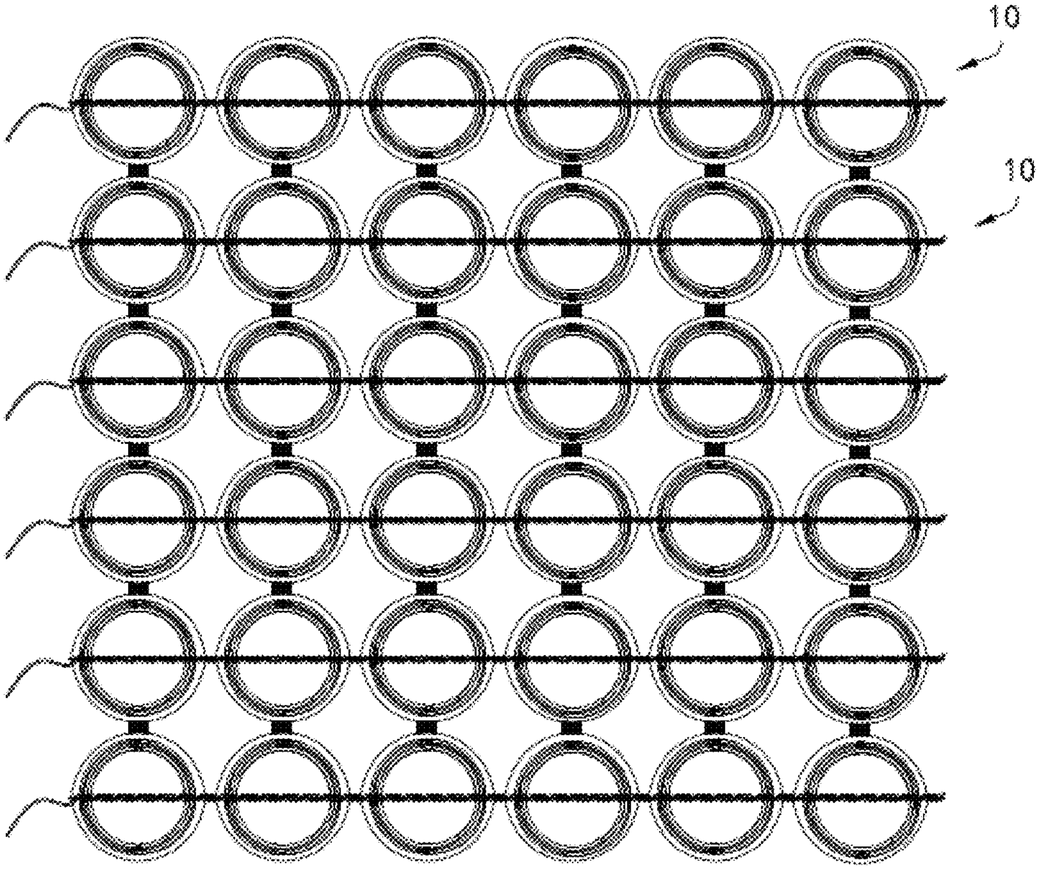
FIG. 4 is a top view of the first embodiment of the pocket spring mattress core of the present invention.
Figure 5:
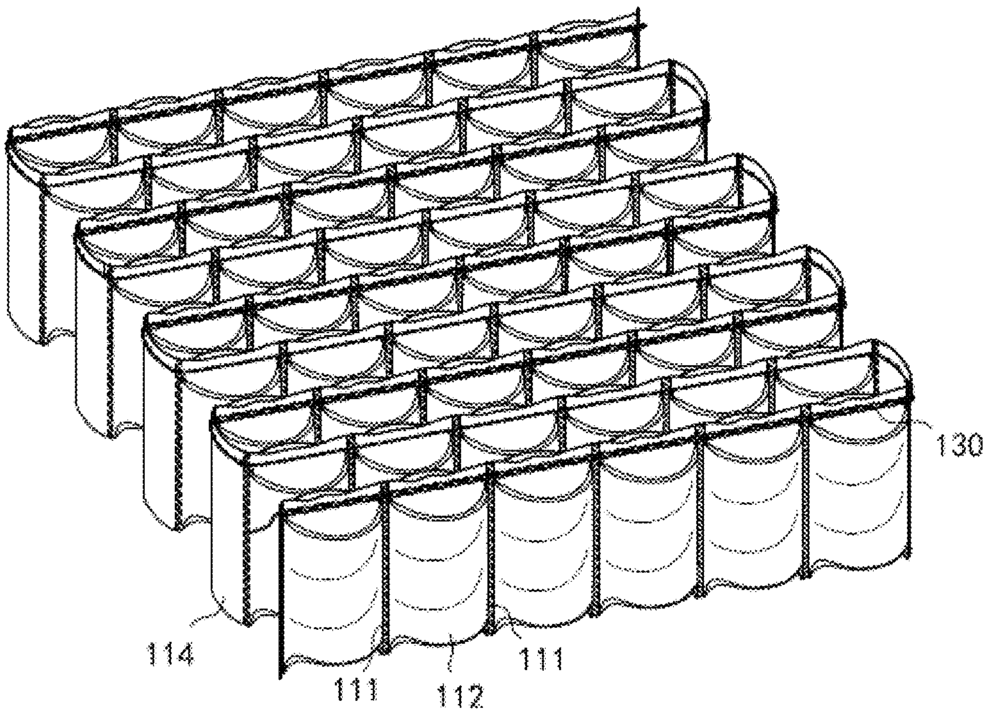
FIG. 5 is a schematic diagram of a second embodiment of the pocket spring mattress core of the present invention.
Figure 6:
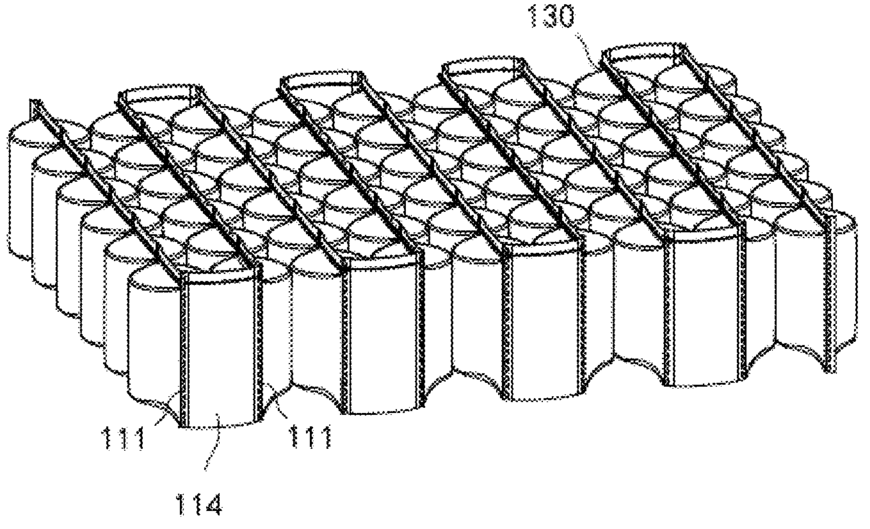
FIG. 6 is a schematic diagram from another perspective of the second embodiment of the pocket spring mattress core of the present invention.
Figure 7:
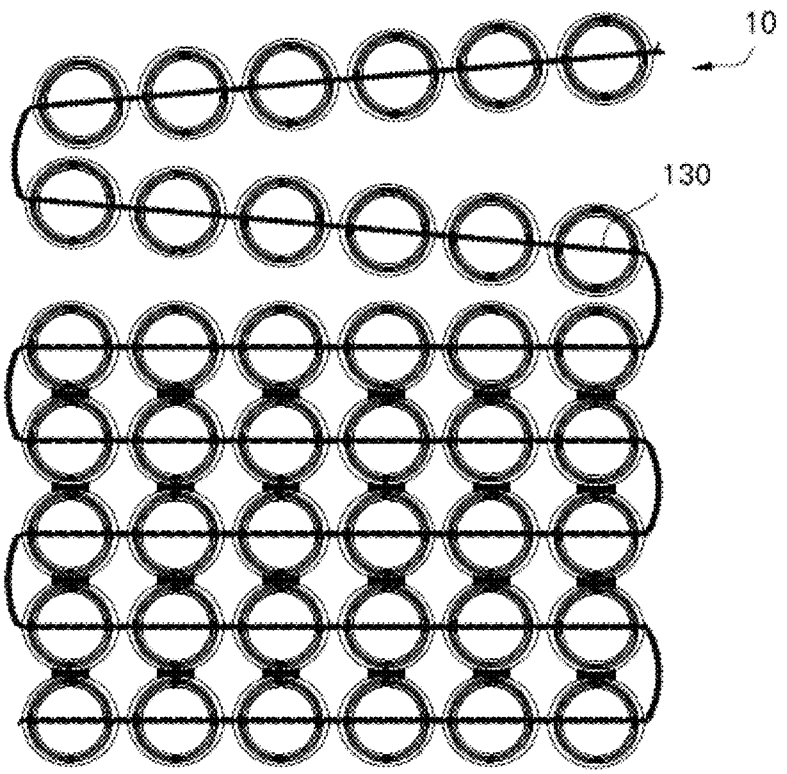
FIG. 7 is a top view of bonding combination of the second embodiment of the pocket spring mattress core of the present invention.
Figure 8:
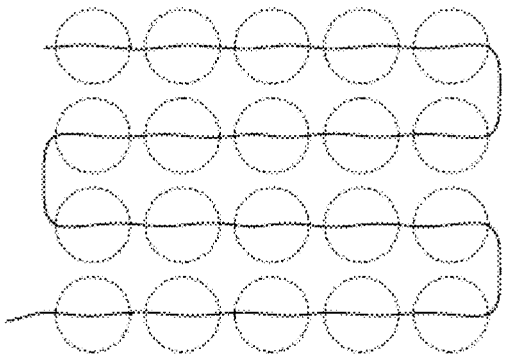
FIG. 8 is a schematic diagram of a thread direction of the second embodiment of the pocket spring mattress core of the present invention.

With reference to FIGS. 3 and 4, an embodiment of the present invention provides a pocket spring mattress core, formed by bonding the above-mentioned pocket spring strings 10, wherein the pocket spring strings 10 are independent of one another and have the same length, and adjacent pocket spring strings 10 are bonded with glue and arranged side by side to form the pocket spring mattress core. Glue bonding is a common bonding process in the prior art, which will no longer be described in detail here. In the pocket spring mattress core, the thread end of the thread 130 is left on each pocket spring string 10, and the springs in each pocket spring string 10 can be separated one by one by removing the thread end of each pocket spring string 10.

In some embodiments, the cloth is polypropylene cloth and the glue is polypropylene glue, both having the same polypropylene material. However, in the traditional pocket spring mattress core manufacturing process, cloth and glue are made of different materials, which makes it impossible to effectively separate and recycle materials. In this embodiment, after the springs made of metal are separated and taken out, the cloth made from polypropylene can be recycled together with the glue.

Referring to FIGS. 5 to 8, an embodiment of the present invention provides a pocket spring string and a pocket spring mattress core. The pocket spring string in this embodiment is similar to the pocket spring string in the previous embodiment. Welds 111 are arranged on cloth 110 to form adjacent independent pockets 112, each pocket 112 is used for receiving and wrapping a corresponding spring 120, and an opening 113 in the top of each pocket 112 is stitched by a continuous thread 130. The difference is that in the pocket spring string in this embodiment, reserved gaps 114 are arranged on the cloth 110 every a preset distance, which can be flexibly determined according to the actual size of the mattress core or a mattress. The reserved gaps 114 are formed by two adjacent welds 111, and the width of the reserved gaps 114 is approximately equal to the diameter of the springs. In this embodiment, the pocket spring mattress core is formed by folding a single pocket spring string. The pocket spring string is subjected to snakelike folding at the reserved gaps 114, thereby forming multiple parallel rows of pocket spring string, and two adjacent rows of pocket spring string are bonded with glue. In this embodiment, the pocket spring mattress core is formed by a single pocket spring string. The thread 130 in the pocket spring mattress core is of a continuous structure. When the cloth and the springs need to be separated, all the springs in each row of pocket spring strings can be separated and taken out by removing the thread 130 once, in high efficiency.

Referring to FIGS. 9 to 14, an embodiment of the present invention provides a pocket spring string and a pocket spring mattress core. The pocket spring string in this embodiment is similar to the pocket spring string in the previous embodiment. Welds 111 are arranged on cloth 110 to form adjacent independent pockets 112, each pocket 112 is used for receiving and wrapping a corresponding spring 120, and an opening 113 in the top of each pocket 112 is stitched by a continuous thread 130. The difference is that in the pocket spring string in this embodiment, adjacent pockets 112 are separated by two welds 111, separation gaps 115 are formed between every two welds 111, and the size of the separation gaps 115 can be flexibly determined as needed. Due to the separation gaps 115, adjacent pockets 112 are not closely next to each other, which facilitates the folding and connection of the pocket spring strings to form the pocket spring mattress core.

Figure 9:
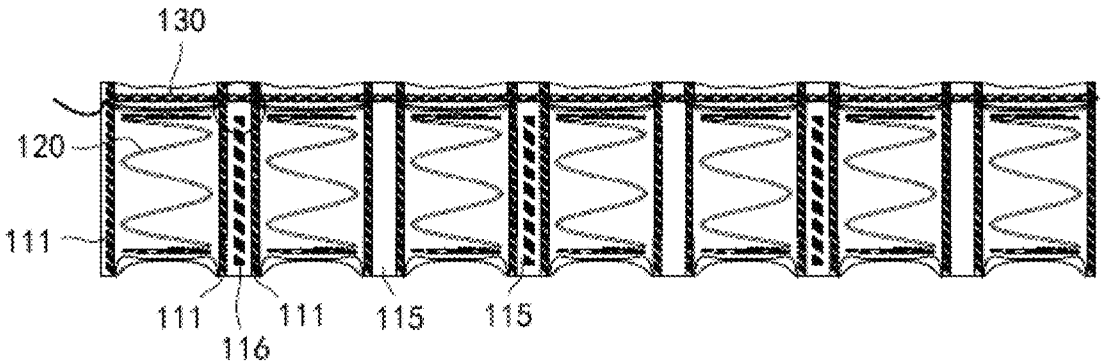
FIG. 9 is a side view of a third embodiment of the pocket spring mattress core of the present invention.
Figure 10:
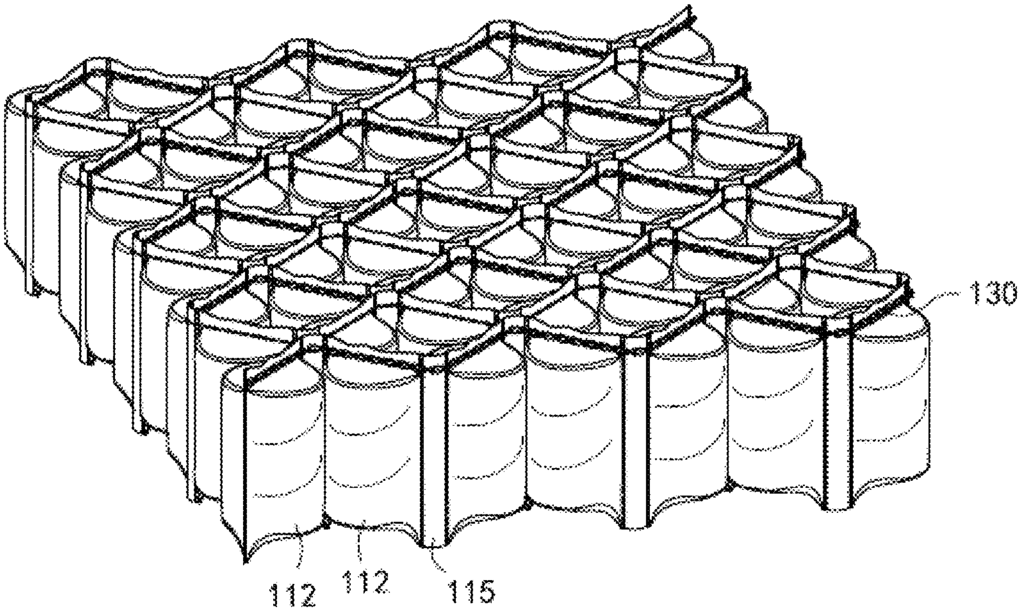
FIG. 10 is a schematic diagram of the third embodiment of the pocket spring mattress core of the present invention.

In this embodiment, the pocket spring mattress core is formed by folding a single pocket spring string. The pocket spring string is subjected to snakelike folding to form multiple parallel rows of pocket spring string, and two adjacent rows of pocket spring string are connected through connection welds 116. Specifically, when two adjacent rows of pocket spring string are located side by side, the separation gaps 115 of the two adjacent rows of pocket spring string correspond to each other and the parts of the cloth at the separation gaps 115 are connected through the connection welds 116, so that the two rows of pocket spring strings are connected. The connection welds 116 can be ultrasonic welds. Connecting two rows of pocket spring string through ultrasonic welds belongs to the prior art, which will no longer be described in detail here. The connection welds 116 are arranged in the up-down direction, and are sequentially arranged every other separation gap 115 in a length direction of the pocket spring string, and the connection welds 116 are all located below the thread 130, so as to avoid the connection of the connection welds 116 and the thread 130, as shown in FIG. 9.

Figure 11:
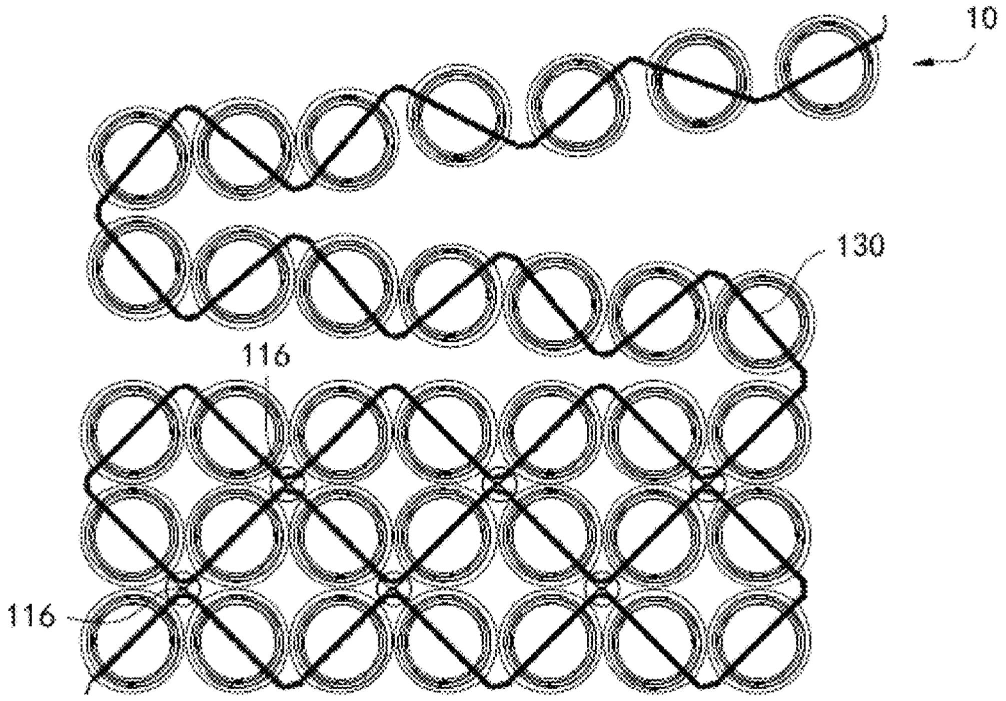
FIG. 11 is a top view of bonding combination of the third embodiment of the pocket spring mattress core of the present invention.
Figure 12:
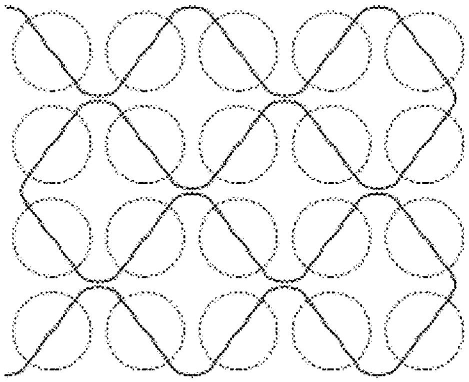
FIG. 12 is a schematic diagram of a thread direction of the third embodiment of the pocket spring mattress core of the present invention.
Figure 13:
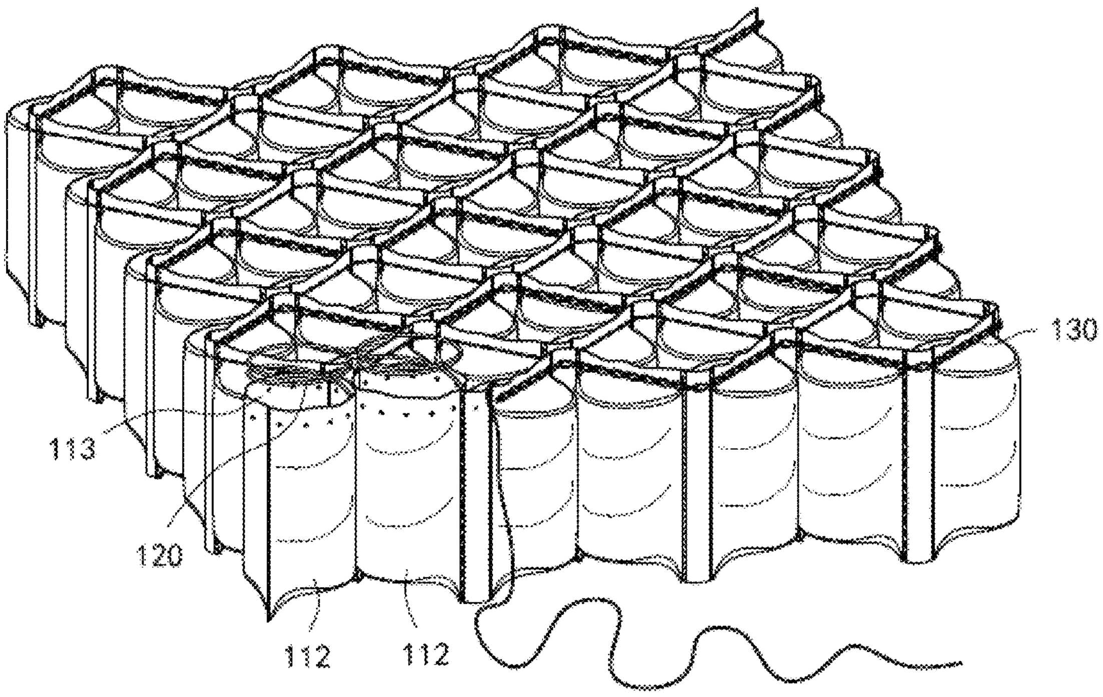
FIG. 13 is a schematic diagram of thread removal of the third embodiment of the pocket spring mattress core of the present invention.
Figure 14:
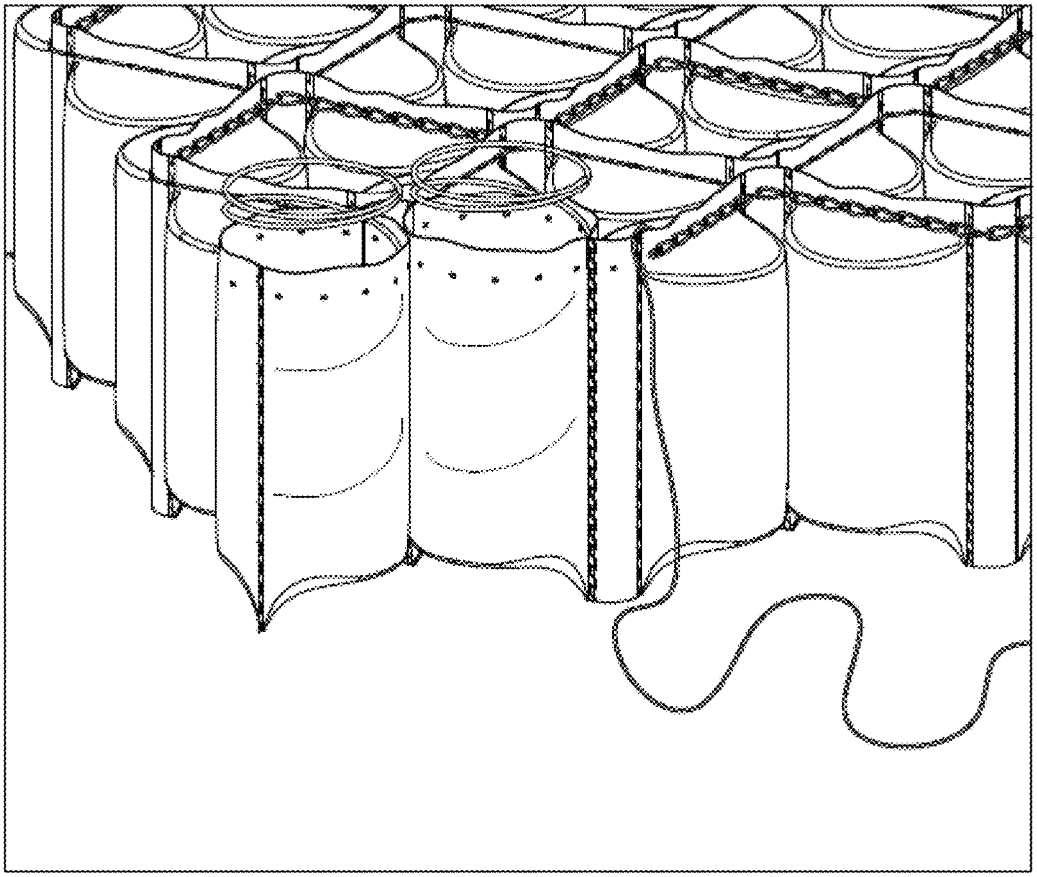
FIG. 14 is a partially enlarged diagram of FIG. 13.

The connection welds 116 in one row are arranged in a staggered manner with the connection welds 116 in the adjacent row, so that different rows of pocket spring string can be tightly bonded to form a whole. For example, a first row of pocket spring string and a second row of pocket spring string are bonded through a first row of connection welds 116, the second row of pocket spring string and a third row of pocket spring string are bonded through a second row of connection welds 116, the third row of pocket spring string and a fourth row of pocket spring string are bonded through a third row of connection welds 116, the first row of connection welds 116 are staggered from the second row of connection welds 116, and the first row of connection welds 116 are aligned with the third row of connection welds 116. In this way, such a weld connection structure makes the pocket spring strings in each row arranged in a wave shape, as shown in FIG. 11, where the thread 130 is also arranged in a wave shape.

In this embodiment, the pocket spring mattress core is formed by a single pocket spring string. The thread 130 in the pocket spring mattress core is of a continuous structure. When the cloth and the springs need to be separated from each other, all the springs in each row of pocket spring strings can be separated and taken out by removing the thread 130 once, in high efficiency. In addition, two adjacent rows of pocket spring string are connected through ultrasonic welds, thus avoiding the use of glue and being beneficial to the recycling of materials.

Figure 15:
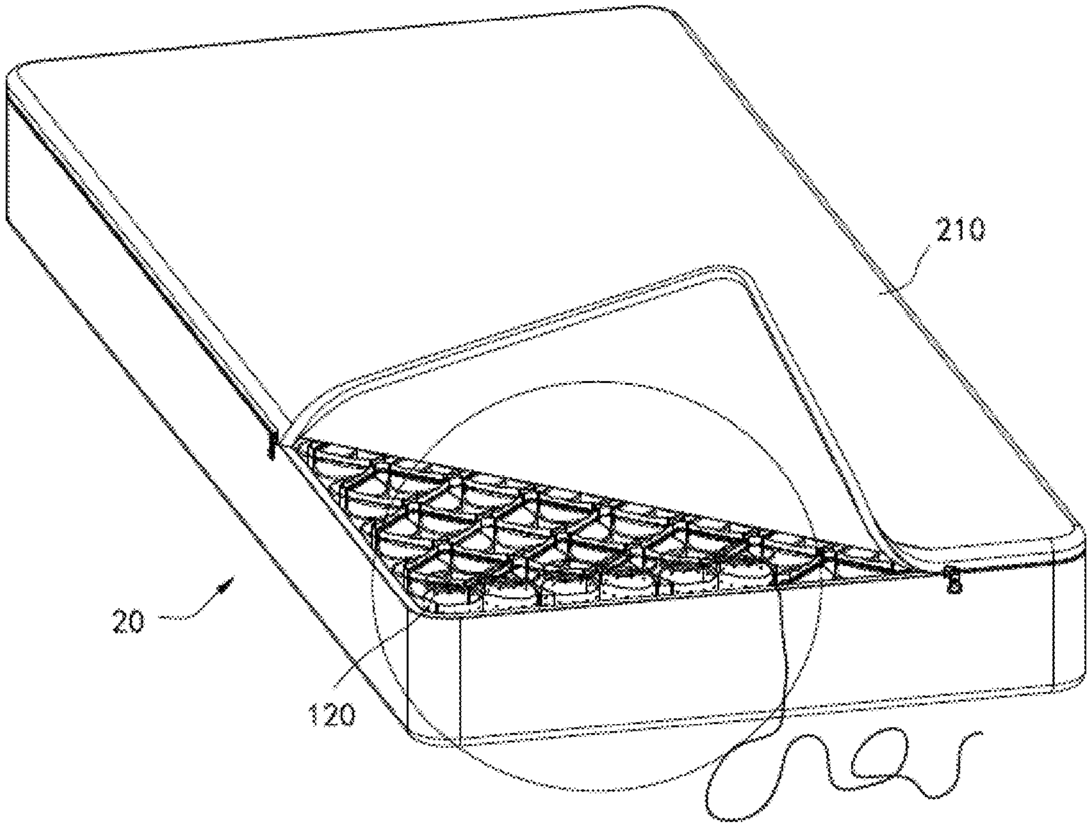
FIG. 15 is a schematic diagram of an embodiment of a mattress of the present invention.
Figure 16:
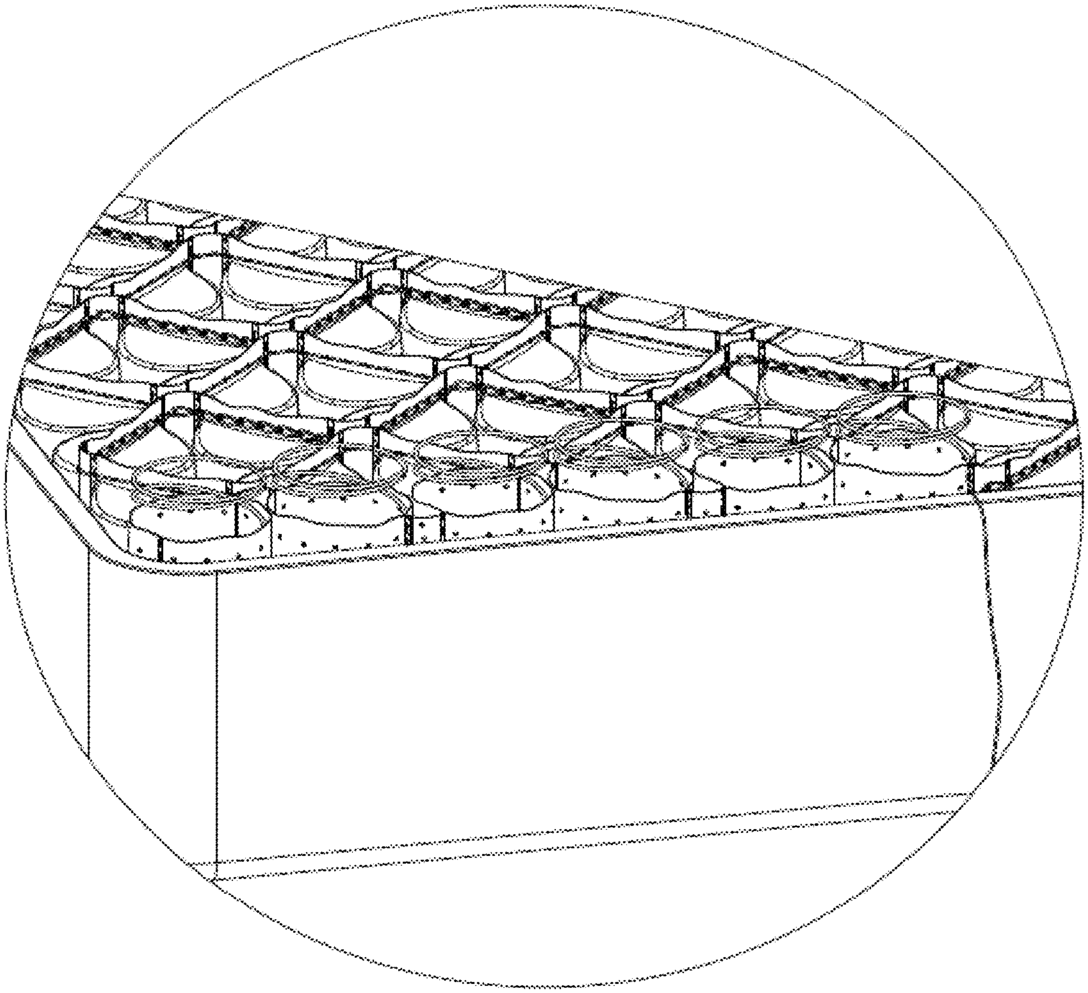
FIG. 16 is a partially enlarged diagram of FIG. 15.

Referring to FIGS. 15 to 16, an embodiment of the present invention provides a mattress 20, which comprises a mattress cover 210 and a mattress core. The mattress cover 210 is detachable and can be detached through zippers, buttons, hook and loop fasteners, etc. The mattress core is the above-mentioned pocket spring mattress core with thread. When the mattress needs to be recycled, one only needs to open the mattress cover and remove the thread to take out the springs easily and quickly, so that the cloth and the springs can be effectively classified and recycled.

The embodiments of the present invention have been described in detail with reference to the attached drawings, but the present invention is not limited to the above embodiments, and various changes can be made within the knowledge of those of ordinarily skilled in the art without departing from the purpose of the present invention.

What is claimed is:

1. A pocket spring string, comprising:

springs;

cloth, folded and provided with welds to form multiple adjacent pockets, a top and/or bottom of each said pocket being provided with an opening, and the springs being received in the pockets respectively; and thread, provided at the top and/or the bottom of each said pocket in a length direction of the pocket spring string, to stitch the openings so that the springs are packaged in the pockets in a compressed state;

wherein the thread is detachably stitched and the thread is of a continuous structure; wherein when the thread is removed, the springs extend out of the openings under their own elastic force.

2. A pocket spring mattress core, comprising the pocket spring string according to claim 1, wherein adjacent pocket spring strings are bonded with glue and arranged side by side.

3. The pocket spring mattress core according to claim 2, wherein the cloth is polypropylene cloth and the glue is polypropylene glue.

4. The pocket spring mattress core according to claim 2, wherein reserved gaps are arranged on the cloth at preset intervals, each said pocket spring string is subjected to S-shaped folding at the corresponding reserved gap to form multiple rows of pocket spring strings bonded with glue and arranged side by side.

5. The pocket spring mattress core according to claim 4, wherein the cloth is polypropylene cloth and the glue is polypropylene glue.

6. The pocket spring mattress core according to claim 2, wherein at least two separation welds are arranged on the cloth to form separation gaps so as to separate adjacent pockets from each other, a single said pocket spring string is subjected to S-shaped folding to form multiple rows of pocket spring string, two adjacent rows of pocket spring string are connected through connection welds arranged at the separation gaps, the connection welds are sequentially arranged at an interval of the separation gap in a length direction of the pocket spring string, and the connection welds in a same row are arranged in a staggered manner with the connection welds in the adjacent row, and the connection welds and the thread do not interfere with each other.

7. The pocket spring mattress core according to claim 6, wherein the connection welds are ultrasonic welds.

8. A mattress, comprising a mattress core and a mattress cover wrapping the mattress core, wherein the mattress core is the pocket spring mattress core according to claim 2.

9. The mattress according to claim 8, wherein the cloth is polypropylene cloth and the glue is polypropylene glue.

10. The mattress according to claim 8, wherein reserved gaps are arranged on the cloth at preset intervals, each said pocket spring string is subjected to S-shaped folding at the corresponding reserved gap to form multiple rows of pocket spring strings bonded with glue and arranged side by side.

11. The mattress according to claim 10, wherein the cloth is polypropylene cloth and the glue is polypropylene glue.

12. The mattress according to claim 8, wherein at least two separation welds are arranged on the cloth to form separation gaps so as to separate adjacent pockets from each other, a single said pocket spring string is subjected to S-shaped folding to form multiple rows of pocket spring string, two adjacent rows of pocket spring string are connected through connection welds arranged at the separation gaps, the connection welds are sequentially arranged at an interval of the separation gap in a length direction of the pocket spring string, and the connection welds in a same row are arranged in a staggered manner with the connection welds in the adjacent row, and the connection welds and the thread do not interfere with each other.

13. The mattress according to claim 12, wherein the cloth is polypropylene cloth and the glue is polypropylene glue.

14. The pocket spring string according to claim 1, wherein reserved gaps are arranged on the cloth at preset intervals.

15. The pocket spring string according to claim 1, wherein at least two separation welds are arranged on the cloth to form separation gaps so as to separate adjacent pockets from each other.

* * * * *